United States Patent
Narieda et al.

(10) Patent No.: US 10,985,485 B2
(45) Date of Patent: Apr. 20, 2021

(54) TIN-PLATED PRODUCT AND METHOD FOR PRODUCING SAME

(71) Applicant: Dowa Metaltech Co., Ltd., Tokyo (JP)

(72) Inventors: Hiroto Narieda, Tokyo (JP); Yuta Sonoda, Tokyo (JP); Tatsuhiro Doi, Tokyo (JP); Takao Tomiya, Tokyo (JP)

(73) Assignee: DOWA METALTECH CO., LTD., Tokyo (JP)

( * ) Notice: Subject to any disclaimer, the term of this patent is extended or adjusted under 35 U.S.C. 154(b) by 22 days.

(21) Appl. No.: 16/462,695

(22) PCT Filed: Nov. 21, 2017

(86) PCT No.: PCT/JP2017/041827
§ 371 (c)(1),
(2) Date: May 21, 2019

(87) PCT Pub. No.: WO2018/105388
PCT Pub. Date: Jun. 14, 2018

(65) Prior Publication Data
US 2020/0076103 A1 Mar. 5, 2020

(30) Foreign Application Priority Data

Dec. 6, 2016 (JP) .............................. JP2016-236780
Mar. 22, 2017 (JP) .............................. JP2017-056366
Nov. 17, 2017 (JP) .............................. JP2017-221415

(51) Int. Cl.
*B32B 15/01* (2006.01)
*B32B 15/20* (2006.01)
(Continued)

(52) U.S. Cl.
CPC ............. *H01R 13/03* (2013.01); *B32B 15/01* (2013.01); *B32B 15/20* (2013.01); *C25D 3/12* (2013.01);
(Continued)

(58) Field of Classification Search
CPC ......... H01R 14/03; B32B 15/01; B32B 15/20; Y10T 428/12715
(Continued)

(56) References Cited

U.S. PATENT DOCUMENTS 5,780,172 A * 7/1998 Fister ...................... B32B 15/01
428/647
2015/0295333 A1* 10/2015 Shibuya ................... C25D 5/10
439/887
2017/0283910 A1* 10/2017 Tsuru ......................... C22C 9/00

FOREIGN PATENT DOCUMENTS

JP 2013134891 A 7/2013
JP 2015053251 A 3/2015
(Continued)

OTHER PUBLICATIONS

Kubota et al., JP 2016-169439 A machine translation, Feb. 25, 2016, entire translation (Year: 2016).*
(Continued)

*Primary Examiner* — Humera N. Sheikh
*Assistant Examiner* — Katherine A Christy
(74) *Attorney, Agent, or Firm* — Bachman & LaPointe, PC

(57) ABSTRACT

There are provided a tin-plated product which has a zinc plating layer on the surface thereof and which has good corrosion resistance and good adhesion of the zinc plating even if the connecting portion of a terminal of the tin-plated product to an electric wire of aluminum or an aluminum alloy is not processed during press fitting such as swaging (or caulking) when the tin-plated product is used as the material of the terminal which is to be connected to the electric wire by press fitting, and a method for producing the same.

11 Claims, 4 Drawing Sheets

(51) Int. Cl.
| | |
|---|---|
| *H01R 13/03* | (2006.01) |
| *C25D 3/22* | (2006.01) |
| *C25D 3/30* | (2006.01) |
| *C25D 5/12* | (2006.01) |
| *C25D 5/50* | (2006.01) |
| *C25D 3/12* | (2006.01) |

(52) U.S. Cl.
 CPC ............. *C25D 3/22* (2013.01); *C25D 3/30* (2013.01); *C25D 5/12* (2013.01); *C25D 5/50* (2013.01); *B32B 2457/00* (2013.01); *Y10T 428/12715* (2015.01)

(58) Field of Classification Search
 USPC ......................................................... 428/647
 See application file for complete search history.

(56) References Cited

FOREIGN PATENT DOCUMENTS

| JP | 2016-169439 A | * | 2/2016 |
|---|---|---|---|
| JP | 2016044346 A | | 4/2016 |

OTHER PUBLICATIONS

International search report for application No. PCT/JP2017/041827 dated Dec. 15, 2017.

\* cited by examiner

TIN-PLATED PRODUCT AND METHOD FOR PRODUCING SAME

TECHNICAL FIELD

The present invention relates generally to a tin-plated product and a method for producing the same. More specifically, the invention relates to a tin-plated product used as the material of a terminal or the like, which is to be connected to an electric wire such as a wire harness, and a method for producing the same.

BACKGROUND ART

Electric wires of copper or copper alloys are conventionally used as electric wires such as automotive wire harnesses, and tin-plated products of copper or copper alloys plated with tin are conventionally used as the materials of terminals which are to be connected to the electric wires.

In recent years, in order to improve fuel efficiency due to the weight saving of automotive vehicles, electric wires of aluminum or aluminum alloys having lower specific gravities than those of copper and copper alloys are used as the electric wires such as automotive wire harnesses.

However, if a terminal of a tin-plated product is connected to an electric wire of aluminum or an aluminum alloy by press fitting such as swaging (or caulking), there is some possibility that galvanic corrosion (for allowing a less-noble metal to melt) may be caused by bringing dissimilar metals into contact with each other, the potential difference between the dissimilar metals being large.

For that reason, a preservative or resin is applied on the connecting portion of the terminal to the electric wire for preventing galvanic corrosion. However, the application of such a preservative or resin lowers the productivity of the tin-plated product to increase the production costs thereof.

As a terminal for preventing galvanic corrosion, there is proposed a terminal having an electric-wire connecting portion having a core-wire barrel portion for connecting a core wire of a first metal (an aluminum material), which is exposed at one end of an electric wire, to the terminal by swaging (or caulking), the terminal being made of a second metal (a copper material) having a smaller ionization tendency than that of the first metal, the electric-wire connecting portion being plated with a third metal (zinc) having an intermediate ionization tendency between those of the first and second metals before swaging (or caulking) the core-wire by the core-wire barrel portion, and the plating layer on the electric-wire connecting portion of the core-wire barrel portion being broken during swaging (or caulking) (see, e.g., Patent Document 1). Prior Art Document(s)

PATENT DOCUMENT(S)

Patent Document 1: Japanese Patent Laid-Open No. 2013-134891 (Paragraph Numbers 0008 and 0022)

SUMMARY OF THE INVENTION

Problem to be Solved by the Invention

However, in the terminal of Patent Document 1, it is required to plate the electric-wire connecting portion with the third metal (zinc), and it is required to form a very thin plating layer so that the plating layer is broken during swaging (or caulking). Therefore, it is difficult to prevent galvanic corrosion for a long period of time. In addition, it was found that, even if a zinc plating layer is formed on the surface of a tin-plated product generally used as the material of terminals, the adhesion of the zinc plating layer is bad, so that the zinc plating layer is easily peeled off during processing the tin-plated product in the form of a terminal when the tin-plated product is used as the material of the terminal.

It is therefore an object of the present invention to eliminate the aforementioned conventional problems and to provide a tin-plated product which has a zinc plating layer on the surface thereof and which has good corrosion resistance and good adhesion of the zinc plating even if the connecting portion of a terminal of the tin-plated product to an electric wire of aluminum or an aluminum alloy is not processed during press fitting such as swaging (or caulking) when the tin-plated product is used as the material of the terminal which is to be connected to the electric wire by press fitting, and a method for producing the same.

Means for Solving the Problem

In order to accomplish the aforementioned object, the inventors have diligently studied and found that it is possible to produce a tin-plated product which has a zinc plating layer on the surface thereof and which has good corrosion resistance and good adhesion of the zinc plating even if the connecting portion of a terminal of the tin-plated product to an electric wire of aluminum or an aluminum alloy is not processed during press fitting such as swaging (or caulking) when the tin-plated product is used as the material of the terminal which is to be connected to the electric wire by press fitting, if the tin-plated product comprises: a base material of copper or a copper alloy; a tin containing layer formed on a surface of the base material, the tin containing layer comprising a copper-tin alloy layer and a tin layer of tin which is formed on a surface of the copper-tin alloy layer and which has a thickness of not larger than 5 µm; a nickel plating layer formed on a surface of the tin containing layer; and a zinc plating layer serving as the outermost layer formed on a surface of the nickel plating layer. Thus, the inventors have made the present invention.

According to the present invention, there is provided a tin-plated product comprising: a base material of copper or a copper alloy; a tin containing layer formed on a surface of the base material, the tin containing layer comprising a copper-tin alloy layer and a tin layer of tin which is formed on a surface of the copper-tin alloy layer and which has a thickness of not larger than 5 µm; a nickel plating layer formed on a surface of the tin containing layer; and a zinc plating layer serving as the outermost layer formed on a surface of the nickel plating layer.

In this tin-plated product, the thickness of the copper-tin alloy layer is preferably 0.2 to 2 µm. The thickness of the nickel plating layer is preferably 0.01 to 5 µm, and the thickness of the zinc plating layer is preferably 0.5 to 40 µm. Between the base material and the tin containing layer, an underlying layer may be formed. In this case, the underlying layer is preferably a layer containing at least one of copper and nickel. The zinc plating layer is preferably formed on a surface of the tin containing layer on only one side of the base material as the outermost layer on the one side thereof, and the tin containing layer is preferably formed on the other side of the base material as the outermost layer of the other side thereof.

The Vickers hardness HV of the zinc plating layer of the above-described tin-plated product is preferably 80 or less. In this case, the arithmetic average roughness Ra of the surface of the zinc plating layer is preferably 0.1 to 3.0 µm, and the glossiness of the surface of the zinc plating layer is preferably 1.2 or less. The nickel plating layer may be preferably formed on a part of a surface of the tin containing layer.

According to the present invention, there is provided a method for producing a tin-plated product, the method comprising the steps of: forming a tin plating layer on a surface of a base material of copper or a copper alloy; carrying out a heat treatment to form a tin containing layer comprising a copper-tin alloy layer and a tin layer of tin which is formed on a surface of the copper-tin alloy layer and which has a thickness of not larger than 5 µm; forming a nickel plating layer on a surface of the tin containing layer; and forming a zinc plating layer on a surface of the nickel plating layer as the outermost layer of the tin-plated product.

In this method for producing a tin-plated product, the heat treatment preferably causes the tin layer to have a thickness of not larger than 5 µm and causes the copper-tin alloy layer to have a thickness of 0.2 to 2 µm. The thickness of the nickel plating layer is preferably 0.01 to 5 µm, and the thickness of the zinc plating layer is preferably 0.5 to 40 µm. Before the tin plating layer is formed, a copper plating layer may be formed to form an underlying layer containing copper between the base material and the tin containing layer. Alternatively, before the tin plating layer is formed, a nickel plating layer and a copper playing layer may be formed in this order to carry out the heat treatment to form an underlying layer containing at least one of copper and nickel between the base material and the nickel plating layer.

In the above-described method for producing a tin-plated product, the zinc plating layer is preferably formed by electroplating in a sulfuric acid containing bath. In this case, the nickel plating layer may be formed on a part of a surface of the tin containing layer.

According to the present invention, there is provided an electric-wire connecting terminal which uses a tin-plating product as a material thereof, the tin-plating product comprising: a base material of copper or a copper alloy; a tin containing layer formed on a surface of the base material, the tin containing layer comprising a copper-tin alloy layer and a tin layer of tin which is formed on a surface of the copper-tin alloy layer and which has a thickness of not larger than 5 µm; a nickel plating layer formed on a part of a surface of the tin containing layer, except for a connecting portion of the terminal to an electric wire; and a zinc plating layer formed on a surface of the nickel plating layer.

In the electric-wire connecting terminal, the thickness of the copper-tin alloy layer is preferably 0.2 to 2 µm. The thickness of the nickel plating layer is preferably 0.01 to 5 µm, and the thickness of the zinc plating layer is preferably 0.5 to 40 µm. Between the base material and the tin containing layer, an underlying layer may be formed. In this case, the underlying layer is preferably a layer containing at least one of copper and nickel. The electric wire is preferably made of aluminum or an aluminum alloy, and is preferably a single wire or a strand wire.

The Vickers hardness HV of the zinc plating layer of the above-described electric-wire connecting terminal is preferably 80 or less. In this case, the arithmetic average roughness Ra of the surface of the zinc plating layer is preferably 0.1 to 3.0 µm, and the glossiness of the surface of the zinc plating layer is preferably 1.2 or less.

Effects of the Invention

According to the present invention, it is possible to produce a tin-plated product which has a zinc plating layer on the surface thereof and which has good corrosion resistance and good adhesion of the zinc plating layer even if the connecting portion of a terminal of the tin-plated product to an electric wire of aluminum or an aluminum alloy is not processed during press fitting such as swaging (or caulking) when the tin-plated product is used as the material of the terminal which is to be connected to the electric wire by press fitting.

MODE FOR CARRYING OUT THE INVENTION

First Preferred Embodiment

Figure 1:
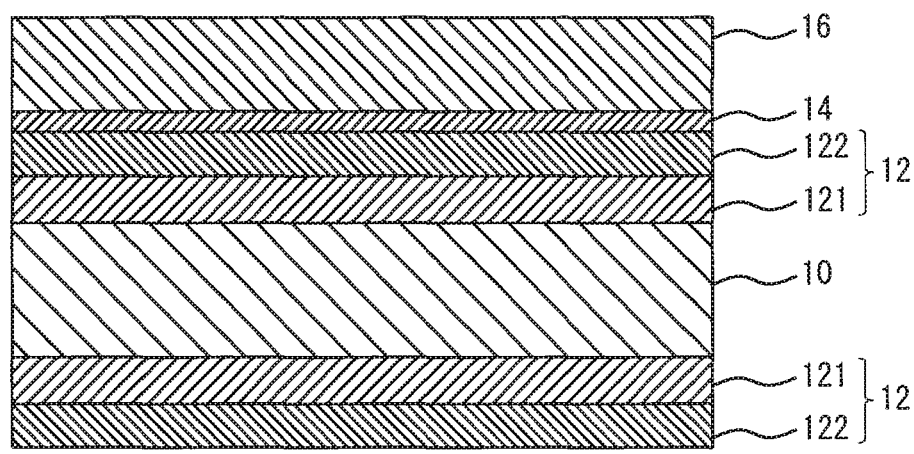
FIG. 1 is a sectional view schematically showing the first and second preferred embodiments of a tin-plated product according to the present invention.

As shown in FIG. 1, the first preferred embodiment of a tin-plated product according to the present invention is a tin-plated product wherein a tin containing layer 12 is formed on the surface (both sides in the shown preferred embodiment) of a base material (a substrate such as a plate or strip) 10 of copper or a copper alloy. The tin containing layer 12 comprises a copper-tin alloy layer 121 and a tin layer 122 of tin which is formed on the surface of the copper-tin alloy layer and which has a thickness of not larger than 5 µm (preferably 0 to 2 µm and more preferably 0.1 to 1.5 µm). On the surface (one side in the shown preferred embodiment) of the tin containing layer 12, a nickel plating layer 14 is formed. On the surface of the nickel plating layer 14, a zinc plating layer 14 is formed as the outermost layer of the tin-plated product. Furthermore, the zinc plating layer 16 is made of zinc (or a zinc alloy containing 90% or more of zinc). By forming the zinc plating layer 16 as the outermost layer of the tin-plated product, it is possible to greatly improve the corrosion resistance of the tin-plated product. By forming the nickel plating layer 14 between the tin containing layer 12 and the zinc plating layer 16, it is possible to greatly improve the adhesion of the zinc plating layer to the tin containing layer 12 (by preventing the formation of a diffusion layer of tin and/or zinc and the generation of voids due to the diffusion thereof by preventing the diffusion of tin of the tin containing layer 12 and zinc of the zinc plating layer 16.

In this tin-plated product, the thickness of the copper-tin alloy layer 121 is preferably 0.2 to 2 µm and more preferably 0.3 to 1.5 µm. The thickness of the nickel plating layer 14 is preferably 0.01 to 5 µm and more preferably 0.02 to 4 µm. The thickness of the nickel plating layer 14 may be 2 µm or less. The thickness of the zinc plating layer 16 is preferably 0.5 to 40 µm, more preferably 1 to 30 µm, and still more preferably 2 to 15 µm. The thickness of the zinc plating layer 16 may be 10 µm or less, and may be 5 µm or less. If the zinc plating layer 16 is too thick, the plating time for forming the zinc plating layer 16 is too long, so that the productivity of the tin-plated product is lowered.

Figure 2:
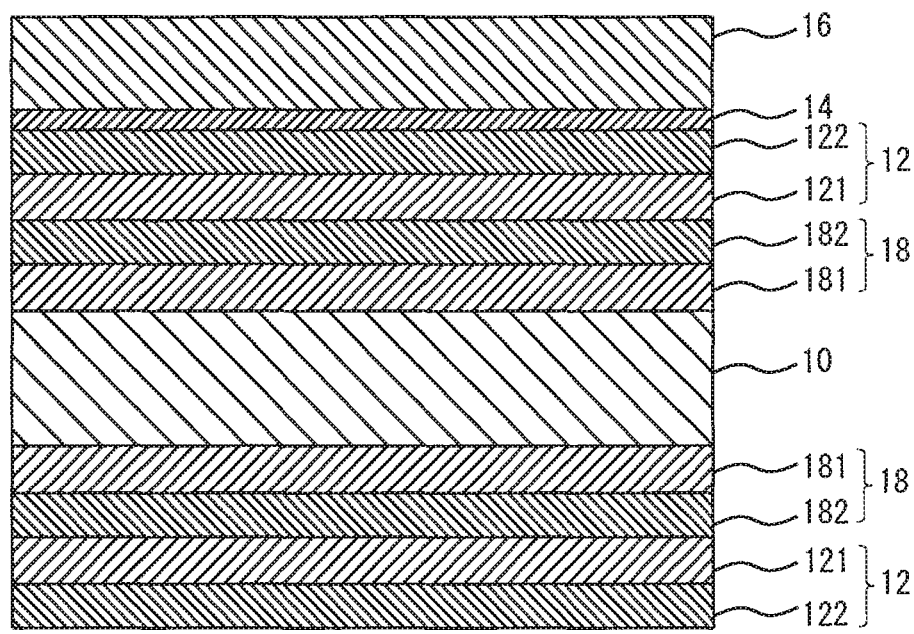
FIG. 2 is a sectional view schematically showing the modified example of the first and second preferred embodiments of a tin-plated product according to the present invention.

As shown in FIG. 2, an underlying layer 18 may be formed between the base material 10 and the tin containing layer 12. In this case, the underlying layer preferably comprises a layer containing at least one of copper and nickel (at least one layer of a nickel layer 181 and a copper layer 182). The thickness of the nickel layer 181 is preferably 0.05 to 1.0 µm. The thickness of the copper layer 182 is preferably 1.5 µm or less, and more preferably 1.0 µm or less. Furthermore, if both layers of the nickel layer 181 and the copper layer 182 are formed as the underlying layer, the nickel layer 181 is preferably formed on the surface of the base material 10, and the copper layer 182 is preferably formed on the surface thereof.

Furthermore, the zinc plating layer may be formed only on a part of the surface of the tin containing layer. In this case, the tin containing layer is the outermost layer on the other portion of the surface of the tin containing layer on which the zinc plating layer is not formed. The thickness of the tin layer of the tin containing layer serving as the outermost layer is preferably 5 µm or less, more preferably 0 to 2 µm, and most preferably 0.1 to 1.5 µm. The thickness of the copper-tin alloy layer of the tin containing layer serving as the outermost layer is preferably 0.2 to 2 µm, and more preferably 0.3 to 1.5 µm.

The tin-plated product in the above-described first preferred embodiment can be produced by the first preferred embodiment of a method for producing a tin-plated product according to the present invention. According to the method for producing a tin-plated product in the first preferred embodiment, it is possible to produce a tin-plated product which has a zinc plating layer on the surface thereof and which has good corrosion resistance and good adhesion of the zinc plating even if the connecting portion of a terminal of the tin-plated product to an electric wire of aluminum or an aluminum alloy is not processed during press fitting such as swaging (or caulking) when the tin-plated product is used as the material of the terminal which is to be connected to the electric wire by press fitting.

In the first preferred embodiment of a tin-plated product according to the present invention, after a tin plating layer (which preferably has a thickness of 0.1 to 2 µm and more preferably has a thickness 0.2 to 1.5 µm) is formed on a surface of a base material of copper or a copper alloy (by electroplating or the like), a heat treatment (reflow treatment) is carried out (by means of a heat treating apparatus such as an infrared heater, a hot air circulation type heat treating apparatus or an immediate firing type heat treating apparatus) to form a tin containing layer comprising a copper-tin alloy layer and a tin layer of tin which is formed on the surface of the copper-tin alloy layer and which has a thickness of not larger than 5 µm (preferably 0 to 2 µm and more preferably 0.1 to 1.5 µm). Then, a nickel plating layer is formed on the surface of the tin containing layer (by electroplating or the like). Thereafter, a zinc plating layer is formed on the surface of the nickel plating layer (by electroplating or the like) as the outermost layer of the tin-plated product.

In this method for producing a tin-plated product, the heat treatment causes the tin layer to have a thickness of not larger than 5 µm (preferably 0 to 2 µm and more preferably 0.1 to 1.5 µm), and preferably causes the copper-tin alloy layer to have a thickness of 0.2 to 2 µm (more preferably 0.3 to 1.5 µm). The thickness of the nickel plating layer is preferably 0.01 to 5 µm, more preferably 0.02 to 4 µm, and may be 2 µm or less. The thickness of the zinc plating layer is preferably 0.5 to µm, more preferably 1 to 30 µm, and still more preferably 2 to 15 µm. The thickness of the zinc plating layer may be 10 µm or less, and may be 5 µm or less. Before the tin plating layer is formed, a copper plating layer (which preferably has a thickness of 0.1 to 1.5 µm) may be formed to form an underlying layer containing copper between the base material and the tin containing layer. Alternatively, before the tin plating layer is formed, a nickel plating layer (which preferably has a thickness of 0.05 to 1.0 µm) and a copper playing layer (which preferably has a thickness of 0.1 to 1.5 µm) may be formed in this order to form an underlying layer containing copper and nickel between the base material and the tin containing layer. The thickness of each of the copper-tin alloy layer and the tin layer can be measured by means of an electrolytic film thickness meter or the like.

Furthermore, the nickel plating layer and the zinc plating layer may be formed on the surface of the tin containing layer on only one side of the base material (or on a part of the surface of the tin containing layer) (by masking or by controlling the height of the plating liquid surface). In this case, the tin containing layer is the outermost layer on the other portion of the surface of the tin containing layer on which the zinc plating layer is not formed. The thickness of the tin layer of the tin containing layer serving as the outermost layer is preferably 5 µm or less, and more preferably 0 to 2 µm.

The above-described tin-plated product in the first preferred embodiment can be used as the material of an electric current carrying member such as a terminal which is to be connected to an electric wire of aluminum or an aluminum alloy. If the nickel plating layer and the zinc plating layer are formed on only a part of the surface of the tin containing layer, the other portion of the surface of the tin containing layer (the portion of the tin containing layer serving as the outermost layer), on which the zinc plating layer is not formed, is preferably connected to an electric wire of aluminum or an aluminum alloy.

Second Preferred Embodiment

As shown in FIG. 1, the second preferred embodiment of a tin-plated product according to the present invention is a tin-plated product wherein a tin containing layer 12 is formed on the surface (both sides in the shown preferred embodiment) of a base material (a substrate such as a plate or strip) 10 of copper or a copper alloy. The tin containing layer 12 comprises a copper-tin alloy layer 121 and a tin layer 122 of tin which is formed on the surface of the copper-tin alloy layer and which has a thickness of not larger than 5 µm (preferably 0 to 2 µm and more preferably 0.1 to 1.5 µm). On the surface (one side in the shown preferred embodiment) of the tin containing layer 12, a nickel plating layer 14 is formed. On the surface of the nickel plating layer 14, a zinc plating layer 14 having a Vickers hardness HV of not higher than 80 is formed as the outermost layer of the tin-plated product. Furthermore, the zinc plating layer 16 is made of zinc (or a zinc alloy containing 90% or more of zinc). By forming the zinc plating layer 16 as the outermost layer of the tin-plated product, it is possible to greatly improve the corrosion resistance of the tin-plated product. By forming the nickel plating layer 14 between the tin containing layer 12 and the zinc plating layer 16, it is possible to greatly improve the adhesion of the zinc plating layer to the tin containing layer 12 (by preventing the formation of a diffusion layer of tin and/or zinc and the generation of voids due to the diffusion thereof by preventing the diffusion of tin of the tin containing layer and zinc of the zinc plating layer 16. If the zinc plating layer 16 is soft (so as to have a Vickers hardness HV of not higher than 80 and preferably have a Vickers hardness HV of not higher than 70), it is possible to inhibit the base material 10 from being exposed by bending the tin-plated product, so that it is possible to inhibit galvanic corrosion (for allowing a less-noble metal to melt) from being caused by bringing dissimilar metals into contact with each other, the potential difference between the dissimilar metals being large. Thus, it is possible to improve the bendability of the tin-plated product.

In this tin-plated product, the arithmetic average roughness Ra of the surface of the zinc plating layer 16 is preferably 0.1 to 3.0 μm. The glossiness of the surface of the zinc plating layer 16 is preferably 1.2 or less, more preferably 0.5 or less, and most preferably 0.1 to 0.2.

The thickness of the copper-tin alloy layer 121 is preferably 0.2 to 2 μm and more preferably 0.3 to 1.5 μm. The thickness of the nickel plating layer 14 is preferably 0.01 to 5 μm and more preferably 0.02 to 4 μm. The thickness of the nickel plating layer 14 may be 2 μm or less. The thickness of the zinc plating layer 16 is preferably 1 to 40 μm, more preferably 1 to 30 μm, and still more preferably 2 to 15 μm. The thickness of the zinc plating layer 16 may be 10 μm or less, and may be 5 μm or less. If the zinc plating layer 16 is too thick, the plating time for forming the zinc plating layer 16 is too long, so that the productivity of the tin-plated product is lowered. If the zinc plating layer 16 is too thin, it is not possible to obtain sufficient corrosion resistance.

As shown in FIG. 2, an underlying layer 18 may be formed between the base material 10 and the tin containing layer 12. In this case, the underlying layer preferably comprises a layer containing at least one of copper and nickel (at least one layer of a nickel layer 181 and a copper layer 182). The thickness of the nickel layer 181 is preferably 0.05 to 1.0 μm. The thickness of the copper layer 182 is preferably 1.5 μm or less, and more preferably 1.0 μm or less. Furthermore, if both layers of the nickel layer 181 and the copper layer 182 are formed as the underlying layer, the nickel layer 181 is preferably formed on the surface of the base material 10, and the copper layer 182 is preferably formed on the surface thereof.

Furthermore, the zinc plating layer may be formed only on a part of the surface of the tin containing layer. In this case, the tin containing layer is the outermost layer on the other portion of the surface of the tin containing layer on which the zinc plating layer is not formed. The thickness of the tin layer of the tin containing layer serving as the outermost layer is preferably 5 μm or less, more preferably 0 to 2 μm, and most preferably 0.1 to 1.5 μm. The thickness of the copper-tin alloy layer of the tin containing layer serving as the outermost layer is preferably 0.2 to 2 μm, and more preferably 0.3 to 1.5 μm.

The tin-plated product in the above-described second preferred embodiment can be produced by the second preferred embodiment of a method for producing a tin-plated product according to the present invention. According to the method for producing a tin-plated product in the second preferred embodiment, it is possible to produce a tin-plated product which has a zinc plating layer on the surface thereof and which has good corrosion resistance and good adhesion of the zinc plating as well as good bendability even if the connecting portion of a terminal of the tin-plated product to an electric wire of aluminum or an aluminum alloy is not processed during press fitting such as swaging (or caulking) when the tin-plated product is used as the material of the terminal which is to be connected to the electric wire by press fitting.

In the second preferred embodiment of a tin-plated product according to the present invention, after a tin plating layer (which preferably has a thickness of 0.1 to 2 μm and more preferably has a thickness 0.2 to 1.5 μm) is formed on the surface of a base material of copper or a copper alloy (by electroplating or the like), a heat treatment (reflow treatment) is carried out (by means of a heat treating apparatus such as an infrared heater, a hot air circulation apparatus or an immediate firing apparatus) to form a tin containing layer comprising a copper-tin alloy layer and a tin layer of tin which is formed on the surface of the copper-tin alloy layer and which has a thickness of not larger than 5 μm (preferably 0 to 2 μm and more preferably 0.1 to 1.5 μm), and a nickel plating layer is formed on the surface of the tin containing layer (by electroplating or the like), and then, a zinc plating layer is formed on the surface of the nickel plating layer as the outermost layer of the tin-plated product by electroplating in a sulfuric acid containing bath.

In this method for producing a tin-plated product, the heat treatment causes the tin layer to have a thickness of not larger than 5 μm (preferably 0 to 2 μm and more preferably 0.1 to 1.5 μm), and preferably causes the copper-tin alloy layer to have a thickness of 0.2 to 2 μm (more preferably 0.3 to 1.5 μm). The thickness of the nickel plating layer is preferably 0.01 to 5 μm, more preferably 0.02 to 4 μm, and may be 2 μm or less. The thickness of the zinc plating layer is preferably 1 to 40 μm, more preferably 1 to 30 μm, and still more preferably to 15 μm. The thickness of the zinc plating layer may be 10 μm or less, and may be 5 μm or less. Before the tin plating layer is formed, a copper plating layer (which preferably has a thickness of 0.1 to 1.5 μm) may be formed to form an underlying layer containing copper between the base material and the tin containing layer. Alternatively, before the tin plating layer is formed, a nickel plating layer (which preferably has a thickness of 0.05 to 1.0 μm) and a copper playing layer (which preferably has a thickness of 0.1 to 1.5 μm) may be formed in this order to form an underlying layer containing copper and nickel between the base material and the tin containing layer. The thickness of each of the copper-tin alloy layer and the tin layer can be measured by means of an electrolytic film thickness meter or the like.

Furthermore, the nickel plating layer and the zinc plating layer may be formed on the surface of the tin containing layer on only one side of the base material (or on a part of the surface of the tin containing layer) (by masking or by controlling the height of the plating liquid surface). In this case, the tin containing layer is the outermost layer on the other portion of the surface of the tin containing layer on which the zinc plating layer is not formed. The thickness of the tin layer of the tin containing layer serving as the outermost layer is preferably 5 μm or less, and more preferably 0 to 2 μm.

The sulfuric acid containing bath, which is used as a zinc plating bath for forming a zinc plating layer, is preferably a sulfuric acid containing bath of an aqueous solution which contains zinc sulfate and ammonium sulfate. The sulfuric acid containing bath preferably contains no additives such as brighteners. If the bath contains no additives, it is possible to reduce the costs for the zinc plating bath. The current density in electroplating for forming the zinc plating layer is preferably a high current density of 15 to 60 $A/dm^2$. If the current density is high, it is possible to improve the productivity of the tin-plated product.

The above-described tin-plated product in the second preferred embodiment can be used as the material of an electric current carrying member such as a terminal which is to be connected to an electric wire of aluminum or an aluminum alloy. If the nickel plating layer and the zinc plating layer are formed on only a part of the surface of the tin containing layer, the other portion of the surface of the tin containing layer (the portion of the tin containing layer serving as the outermost layer), on which the zinc plating layer is not formed, is preferably connected to an electric wire of aluminum or an aluminum alloy.

EXAMPLES

Examples of a tin-plated product and a method for producing the same according to the present invention will be described below in detail.

Example 1

First, there was prepared a plate-shaped conductive base material of a Cu—Ni—Sn—P alloy) having a size of 50 mm×50 mm×0.25 mm (a base material of a copper alloy comprising 1.0% by weight of nickel, 0.9% by weight of tin, 0.05% by weight of phosphorus and the balance being copper) (NB-109-EH produced by DOWA METALTECH CO., LTD.).

Then, as a pretreatment, the base material (a material to be plated) was electrolytic-degreased for 10 seconds by an alkaline electrolytic degreaser, and then, washed with water. Thereafter, the base material was immersed in 100 g/L of sulfuric acid to be pickled, and then, washed with water.

Then, the pretreated base material and a tin electrode plate were used as a cathode and an anode, respectively, to electroplate the base material at a current density of 5 $A/dm^2$ and a liquid temperature of 25° C. for 20 seconds in a tin plating solution containing 60 g/L of tin sulfate, 75 g/L of sulfuric acid, 30 g/L of cresolsulphonate and 1 g/L of β-naphthol to form a tin plating layer having a thickness of 1 μm on the surface of the base material to obtain a tin-plated product.

After the tin-plated product thus obtained was washed and dried, a heat treatment (reflow treatment) was carried out. In this reflow treatment, two near-infrared heaters (HYP-8N produced by HYBEC CORPORATION, rated voltage=100 V, rated power=560 W, parallel irradiation type) were arranged so as to face each other at an interval of 25 mm, and the tin-plated product was arranged at the central portion between the near-infrared heaters to be heated at a set current value of 10.8 A for 13 seconds in the atmosphere to melt the surface thereof. Immediately after melting the surface of the tin plating layer, the tin-plated product was immersed in a water tank at 25° C. to be cooled.

The tin-plated product thus reflow-treated was cut by means of a focused ion beam (FIB) to expose a cross-section perpendicular to the rolling direction of the tin-plated product, and the cross-section was analyzed by means of a field emission Auger electron spectrometer (FE-AES). As a result, it was confirmed that a copper-tin alloy layer of a copper-tin alloy was formed on the surface of the base material of the tin-plated product and that a tin layer of tin was formed on the surface of the copper-tin alloy layer. The thickness of each of the copper-tin alloy layer and the tin layer was measured by means of an electrolytic film thickness meter (Thickness Tester TH-11 produced by CHUO SEISAKUSHO LTD.). As a result, the thickness of the copper-tin alloy layer was 0.6 μm, and the thickness of the tin layer was 0.7 μm.

After the whole surface of one side of the tin-plated product thus reflow-treated was masked by applying a tape thereon, the tin-plated product was immersed in an aqueous solution containing 40 g/L of sodium hydroxide to be electrolytic-degreased for 30 seconds at 10 $A/dm^2$. Then, the tin-plated product was immersed in 100 g/L of sulfuric acid for 30 seconds to be pickled, and then, washed with water.

Then, the tin-plated product (the whole surface of the one side of which was masked by applying the tape thereon) and a nickel electrode plate were used as a cathode and an anode, respectively, to electroplate the tin-plated product at a current density of 10 $A/dm^2$ and a liquid temperature of 50° C. for 6 seconds in a nickel plating bath (a sulfamic acid containing bath) containing g/L of nickel sulfamate and 50 g/L of boric acid to form a nickel plating layer on the other side of the tin-plated product. The thickness of the nickel plating layer was measured by means of an X-ray fluorescent analysis thickness meter (produced by Seiko Instruments Inc.). As a result, the thickness of the nickel plating layer was 0.2 μm.

Then, the tin-plated produce thus plated with nickel (by masking the whole surface of the one side thereof by applying the tape thereon) and a zinc electrode plate were used as a cathode and an anode, respectively, to electroplate the tin-plated product at a current density of 16 $A/dm^2$ and a liquid temperature of 25° C. for 45 seconds in a zinc plating bath containing 35 g/L of metal zinc, 200 g/L of potassium chloride, 30 g/L of boric acid, 30 mL/L of a brightener (Zinc ACK-1 produced by Okuno Chemical Industries, Co., Ltd.), and 2 mL/L of a brightener (Zinc ACK-2 produced by Okuno Chemical Industries, Co., Ltd.) to form a zinc plating layer on the surface of the nickel plating layer formed on the other side of the tin-plated product. The thickness of the zinc plating layer was measured by means of an X-ray fluorescent analysis thickness meter (produced by Seiko Instruments Inc.). As a result, the thickness of the zinc plating layer was 3 μm.

The tin-plated product, on which the zinc plating layer was thus formed, was cut by means of a focused ion beam (FIB) processing-observing device to expose a cross-section perpendicular to the rolling direction of the tin-plated product, and the cross-section was analyzed by means of a field emission Auger electron spectrometer (FE-AES). As a result, it was confirmed that a copper-tin alloy layer of a copper-tin alloy was formed on the surface of the base material of the tin-plated product, that a tin layer of tin was formed on the surface of the copper-tin alloy layer, that a nickel plating layer was formed on the surface of the tin layer and that a zinc plating layer was formed on the nickel plating layer. The thickness of each of these layers was measured from a scanning ion microscope image (SIM image). As a result, the thickness of the copper-tin alloy layer was 0.6 μm, the thickness of the tin layer was 0.7 μm, the thickness of the nickel layer was 0.2 μm, and the thickness of the zinc plating layer was 3 μm.

Figure 3A:
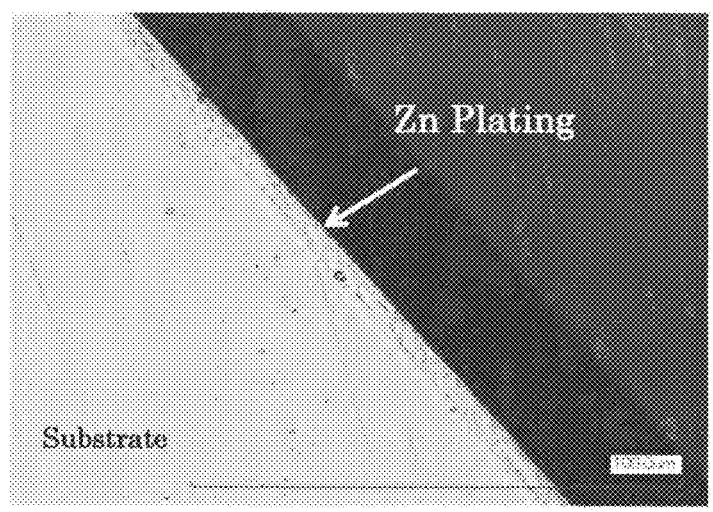
FIG. 3A is a photomicrograph of a linear portion of a test piece (rubbed against a die) after the 90° W bending, the test piece being cut off from a tin-plated product in Example 1.
Figure 3B:
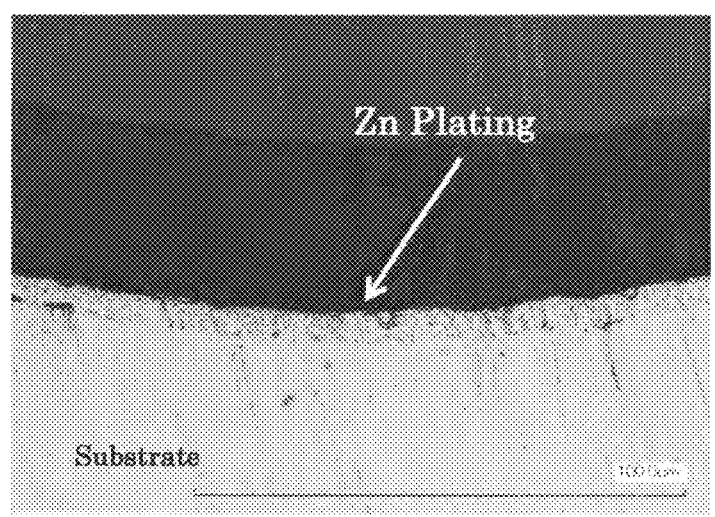
FIG. 3B is a photomicrograph of a valley-fold bent portion of a test piece after the 90° W bending, the test piece being cut off from a tin-plated product in Example 1.

Then, a load of 10 kN was applied on a test piece having a size of 50 mm×10 mm×0.25 mm, which was cut off from the tin-plated product having the zinc plating layer, to carry out the 90° W bending of the test piece so that the ratio R/t of the minimum bending radius R to the thickness t of the test piece was 1.0, and the test piece was embedded in a resin. Thereafter, the test piece embedded in the resin was cut in directions parallel to the longitudinal directions of the test piece (directions perpendicular to the bending axis in the 90° W bending). Then, the cross-section was enlarged by means of a laser microscope to observe the linear portion (rubbed against a die), valley-fold bent portion and mountain-fold bent portion of the test piece to evaluate the presence of separation of the zinc plating layer with the naked eye. As a result, the zinc plating layer was not peeled off from any portions, so that the adhesion (initial adhesion) of the zinc plating layer was good. Furthermore, the photomicrographs of the linear portion and valley-fold bent portion after the 90° W bending are shown in FIGS. 3A and 3B, respectively.

After a test piece having a size of 50 mm×10 mm×0.25 mm, which was cut off from the tin-plated product having the zinc plating layer, was held at 120° C. for 120 hours, the adhesion (adhesion after a heat resistance test) of the zinc plating layer was evaluated by the same method as the above-described method. As a result, the zinc plating layer was not peeled off from any portions, so that the adhesion of the zinc plating layer was good.

While the zinc plating layer of a test piece having a size of 50 mm×10 mm×0.25 mm, which was cut off from the tin-plated product having the zinc plating layer, was arranged on the outside, a single wire of pure aluminum (A1070) having a diameter of 0.8 mm and a length of 30 mm was swaged (or caulked) by the test piece. Then, the single wire swaged (or caulked) by the test piece was immersed in an aqueous solution containing 5% by weight of NaCl for evaluating corrosion resistance on the basis of generation time of gas due to galvanic corrosion (for allowing a less-noble metal to melt). As a result, the time to generate gas was a long time of not less than 192 hours, so that the corrosion resistance thereof was good.

Example 2

A tin-plated product having a zinc plating film was produced by the same method as that in Example 1, except that the pickling of the tin-plated product was not carried out after the reflow treatment and that the tin-plated product (masked by applying a tape on the whole surface of one side thereof) and a nickel electrode plate were used as a cathode and an anode, respectively, for electroplating at a current density of 10 A/dm² and a liquid temperature of 60° C. for 6 seconds in a nickel plating bath (Wood's bath) containing 200 g/L of nickel chloride and 100 g/L of hydrochloric acid.

The adhesion and corrosion resistance of the tin-plated product thus produced were evaluated by the same methods as those in Example 1. As a result, the zinc plating layer was not peeled off initially and after the heat resistance test, so that the adhesion of the zinc plating layer was good. The time to generate gas was a long time of not less than 192 hours, so that the corrosion resistance thereof was good.

Example 3

A tin-plated product having a zinc plating film was produced by the same method as that in Example 1, except that the nickel plating layer was formed so as to have a thickness of 3 μm by electroplating for 90 seconds.

The adhesion and corrosion resistance of the tin-plated product thus produced were evaluated by the same methods as those in Example 1. As a result, the zinc plating layer was not peeled off initially and after the heat resistance test, so that the adhesion of the zinc plating layer was good. The time to generate gas was a long time of not less than 192 hours, so that the corrosion resistance thereof was good.

Example 4

A tin-plated product having a zinc plating film was produced by the same method as that in Example 1, except that the nickel plating layer was formed so as to have a thickness of 0.05 μm by electroplating for 2 seconds.

The adhesion and corrosion resistance of the tin-plated product thus produced were evaluated by the same methods as those in Example 1. As a result, the zinc plating layer was not peeled off initially and after the heat resistance test, so that the adhesion of the zinc plating layer was good. The time to generate gas was a long time of not less than 192 hours, so that the corrosion resistance thereof was good.

Example 5

A tin-plated product having a zinc plating film was produced by the same method as that in Example 1, except that the nickel plating layer was formed so as to have a thickness of 40 μm by electroplating for 620 seconds.

The adhesion and corrosion resistance of the tin-plated product thus produced were evaluated by the same methods as those in Example 1. As a result, the zinc plating layer was not peeled off initially and after the heat resistance test, so that the adhesion of the zinc plating layer was good. The time to generate gas was a long time of not less than 192 hours, so that the corrosion resistance thereof was good.

Example 6

A tin-plated product having a zinc plating film was produced by the same method as that in Example 1, except that the nickel plating layer was formed so as to have a thickness of 1 μm by electroplating for 15 seconds.

The adhesion and corrosion resistance of the tin-plated product thus produced were evaluated by the same methods as those in Example 1. As a result, the zinc plating layer was not peeled off, so that the adhesion of the zinc plating layer was good. The time to generate gas was a long time of 144 hours, so that the corrosion resistance thereof was good.

Example 7

A tin-plated product having a zinc plating film was produced by the same method as that in Example 1, except that a nickel plating layer having a thickness of 0.3 μm was formed on the base material after the pretreatment and before the formation of a tin plating layer, and thereafter, a copper plating layer having a thickness of 0.3 μm was formed, and then, the tin plating layer was formed so as to have a thickness of 0.7 μm by electroplating for 14 seconds. Furthermore, the pretreated base material (the material to be plated) and a nickel electrode plate were used as a cathode and an anode, respectively, for electroplating at a current density of 5 A/dm² and a liquid temperature of 50° C. for 15 seconds in a nickel plating solution containing 80 g/L of nickel sulfamate and 45 g/L of boric acid to form the nickel plating layer. The base material plated with nickel, and a copper electrode plate were used as a cathode and an anode, respectively, for electroplating at a current density of 5 A/dm$^2$ and a liquid temperature of 30° C. for 12 seconds in a copper plating solution containing 110 g/L of copper sulfate and 100 g/L of sulfuric acid to form the copper plating layer.

The tin-plated product thus reflow-treated was analyzed by the same method as that in Example 1. As a result, it was confirmed that a nickel layer and a copper-tin alloy layer (of a copper-tin alloy) were formed on the surface of the base material of the tin-plated product and that a tin layer of tin was formed on the surface of the copper-tin alloy layer. Furthermore, the reflow treatment caused copper of the copper plating layer to diffuse to form the copper-tin alloy layer, so that the copper layer was not observed. The thickness of each of the copper-tin alloy layer and the tin layer was measured by the same method as that in Example 1. As a result, the thickness of the copper-tin alloy layer was 0.6 μm, and the thickness of the tin layer was 0.4 μm. The thickness of the nickel layer was measured by means of an X-ray fluorescent analysis thickness meter (produced by Seiko Instruments Inc.). As a result, the thickness of the nickel plating layer was 0.3 μm.

The adhesion and corrosion resistance of the tin-plated product thus produced were evaluated by the same methods as those in Example 1. As a result, the zinc plating layer was not peeled off, so that the adhesion of the zinc plating layer was good. The time to generate gas was a long time of not less than 192 hours, so that the corrosion resistance thereof was good.

Example 8

A tin-plated product having a zinc plating film was produced by the same method as that in Example 1, except that there was used a plate-shaped conductive base material of a Cu—Zn alloy having a size of 50 mm×50 mm×0.25 mm (a base material of a copper alloy (C2600) comprising 30% by weight of zinc and the balance being copper) and that a copper plating layer having a thickness of 1.0 μm was formed on the base material after the pretreatment and before the formation of a tin plating layer. Furthermore, the base material and a copper electrode plate were used as a cathode and an anode, respectively, for electroplating at a current density of 5 A/dm$^2$ and a liquid temperature of 30° C. for 40 seconds in a copper plating solution containing 110 g/L of copper sulfate and 100 g/L of sulfuric acid to form the copper plating layer.

The tin-plated product thus reflow-treated was analyzed by the same method as that in Example 1. As a result, it was confirmed that a copper layer and a copper-tin alloy layer (of a copper-tin alloy) were formed on the surface of the base material of the tin-plated product and that a tin layer of tin was formed on the surface of the copper-tin alloy layer. The thickness of each of the copper-tin alloy layer and the tin layer was measured by the same method as that in Example 1. As a result, the thickness of the copper-tin alloy layer was 0.6 μm, and the thickness of the tin layer was 0.7 μm. The thickness of the copper layer was measured by means of an electrolytic film thickness meter (Thickness Tester TH-11 produced by CHUO SEISAKUSHO LTD.). As a result, the thickness of the copper layer was 0.7 μm.

The adhesion and corrosion resistance of the tin-plated product thus produced were evaluated by the same methods as those in Example 1. As a result, the zinc plating layer was not peeled off, so that the adhesion of the zinc plating layer was good. The time to generate gas was a long time of not less than 192 hours, so that the corrosion resistance thereof was good.

Comparative Example 1

A tin-plated product was produced by the same method as that in Example 1, except that the electrolytic-degreasing and pickling of the tin-plated product were not carried out after the reflow treatment and that the nickel plating layer and the zinc plating layer were not formed on the surface of the tin-plated product.

The corrosion resistance of the tin-plated product thus produced was evaluated by the same methods as that in Example 1. As a result, the time to generate gas was a very short time of 2 hours, so that the corrosion resistance thereof was bad.

Comparative Example 2

A tin-plated product was produced by the same method as that in Example 1, except that the electrolytic-degreasing and pickling of the tin-plated product were not carried out after the reflow treatment and that the nickel plating layer was not formed on the surface of the tin-plated product.

Figure 4A:
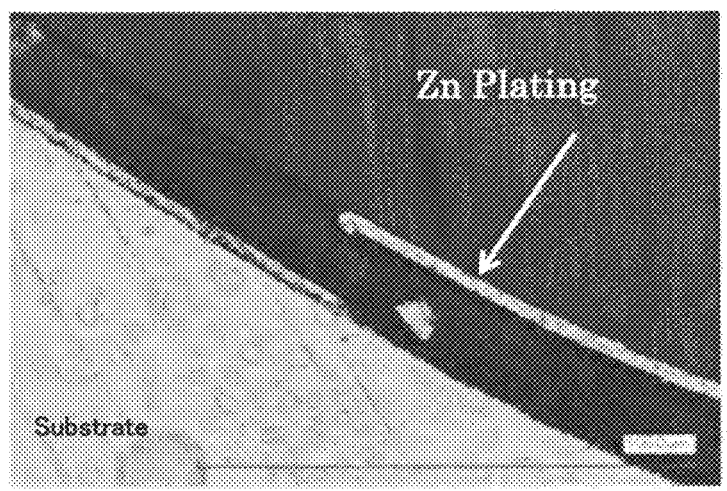
FIG. 4A is a photomicrograph of a linear portion of a test piece (rubbed against a die) after the 90° W bending, the test piece being cut off from a tin-plated product in Comparative Example 2.
Figure 4B:
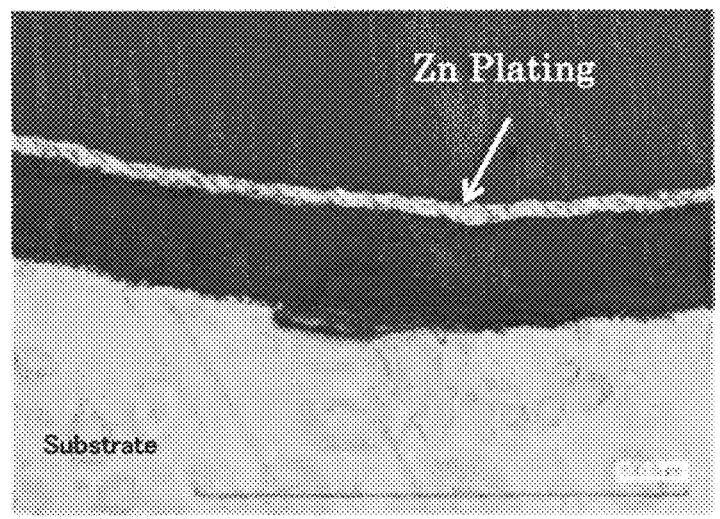
FIG. 4B is a photomicrograph of a valley-fold bent portion of a test piece after the 90° W bending, the test piece being cut off from a tin-plated product in Comparative Example 2.

The (initial) adhesion of the zinc plating layer of the tin-plated product thus produced was evaluated by the same method as that in Example 1. As a result, although the zinc plating layer was not peeled off on the surface of the mountain-fold bent portion, the zinc plating layer was peeled off on the linear portion (rubbed against a die) and the valley-fold bent portion as shown in FIGS. 4A and 4B, so that the adhesion of the zinc plating layer was not good.

Comparative Example 3

A tin-plated product was produced by the same method as that in Example 1, except that the nickel plating layer was not formed on the surface of the tin-plated product.

The (initial) adhesion of the zinc plating layer of the tin-plated product thus produced was evaluated by the same method as that in Example 1. As a result, although the zinc plating layer was not peeled off on the surface of the mountain-fold bent portion, the zinc plating layer was peeled off on the linear portion (rubbed against a die) and the valley-fold bent portion, so that the adhesion of the zinc plating layer was not good.

Comparative Example 4

A tin-plated product having a zinc plating film was produced by the same method as that in Example 1, except that the nickel plating layer was formed on the surface of the tin-plated product so as to have a thickness of 10 μm by electroplating for 290 seconds.

The (initial) adhesion of the zinc plating layer of the tin-plated product thus produced was evaluated by the same method as that in Example 1. As a result, although the zinc plating layer was not peeled off on the surface of the mountain-fold bent portion, the zinc plating layer was peeled off on the linear portion (rubbed against a die) and the valley-fold bent portion, so that the adhesion of the zinc plating layer was not good.

The producing conditions and characteristics of the tin-plated products in these Examples and Comparative Examples are shown in Tables 1 through 3. Furthermore, in Table 3, "○" is shown if the adhesive was good, and "x" is shown if the zinc plating layer was peeled off so that the adhesive was not good.

TABLE 1

| | Base Material | Thickness (μm) of Layers | | | | |
|---|---|---|---|---|---|---|
| | | Before Reflow Treatment | | | After Reflow Treatment | |
| | | Ni | Cu | Sn | CuSn | Sn |
| Ex. 1 | NB-109 | 0 | 0 | 1 | 0.6 | 0.7 |
| Ex. 2 | NB-109 | 0 | 0 | 1 | 0.6 | 0.7 |
| Ex. 3 | NB-109 | 0 | 0 | 1 | 0.6 | 0.7 |
| Ex. 4 | NB-109 | 0 | 0 | 1 | 0.6 | 0.7 |
| Ex. 5 | NB-109 | 0 | 0 | 1 | 0.6 | 0.7 |
| Ex. 6 | NB-109 | 0 | 0 | 1 | 0.6 | 0.7 |
| Ex. 7 | NB-109 | 0.3 | 0.3 | 0.7 | 0.6 | 0.4 |
| Ex. 8 | C2600 | 0 | 1 | 1 | 0.6 | 0.7 |
| Comp. 1 | NB-109 | 0 | 0 | 1 | 0.6 | 0.7 |
| Comp. 2 | NB-109 | 0 | 0 | 1 | 0.6 | 0.7 |
| Comp. 3 | NB-109 | 0 | 0 | 1 | 0.6 | 0.7 |
| Comp. 4 | NB-109 | 0 | 0 | 1 | 0.6 | 0.7 |

TABLE 2

| | Electrolytic Degreasing Time (sec) | Pickling Time (sec) | Ni Plating | | |
|---|---|---|---|---|---|
| | | | Plating Bath | Thickness (μm) of Plating | Thickness (μm) of Zn Plating Layer |
| Ex. 1 | 30 | 30 | SAB | 0.2 | 3 |
| Ex. 2 | 30 | 0 | WB | 0.2 | 3 |
| Ex. 3 | 30 | 30 | SAB | 3 | 3 |
| Ex. 4 | 30 | 30 | SAB | 0.05 | 3 |
| Ex. 5 | 30 | 30 | SAB | 0.2 | 40 |
| Ex. 6 | 30 | 30 | SAB | 0.2 | 1 |
| Ex. 7 | 30 | 30 | SAB | 0.2 | 3 |
| Ex. 8 | 30 | 30 | SAB | 0.2 | 3 |
| Comp. 1 | — | — | — | 0 | 0 |
| Comp. 2 | — | — | — | 0 | 3 |
| Comp. 3 | 30 | 30 | — | 0 | 3 |
| Comp. 4 | 30 | 30 | SAB | 10 | 3 |

*SAB: Sulfamic Acid containing Bath
**WB: Wood's Bath

TABLE 3

| | Adhesion | | Gas Generation Time (h) |
|---|---|---|---|
| | Initial | After Heat Resistance Test | |
| Ex. 1 | ○ | ○ | 192 or more |
| Ex. 2 | ○ | ○ | 192 or more |
| Ex. 3 | ○ | ○ | 192 or more |
| Ex. 4 | ○ | ○ | 192 or more |
| Ex. 5 | ○ | ○ | 192 or more |
| Ex. 6 | ○ | ○ | 144 |
| Ex. 7 | ○ | ○ | 192 or more |
| Ex. 8 | ○ | ○ | 192 or more |
| Comp. 1 | — | — | 2 |
| Comp. 2 | x | — | — |
| Comp. 3 | x | — | — |
| Comp. 4 | x | — | — |

Example 9

First, there was prepared a plate-shaped conductive base material of a Cu—Ni—Sn—P alloy having a size of 50 mm×50 mm×0.25 mm (a base material of a copper alloy comprising 1.0% by weight of nickel, 0.9% by weight of tin, 0.05% by weight of phosphorus and the balance being copper) (NB-109-EH produced by DOWA METALTECH CO., LTD.).

Then, as a pretreatment, the base material (a material to be plated) was electrolytic-degreased for 10 seconds by an alkaline electrolytic degreaser, and then, washed with water. Thereafter, the base material was immersed in 100 g/L of sulfuric acid to be pickled, and then, washed with water.

Then, the pretreated base material and a tin electrode plate were used as a cathode and an anode, respectively, to electroplate the base material at a current density of 5 A/dm$^2$ and a liquid temperature of 25° C. for 20 seconds in a tin plating solution containing 60 g/L of tin sulfate, 75 g/L of sulfuric acid, 30 g/L of cresolsulphonate and 1 g/L of β-naphthol to form a tin plating layer having a thickness of 1 μm on the surface of the base material to obtain a tin-plated product.

After the tin-plated product thus obtained was washed and dried, a heat treatment (reflow treatment) was carried out. In this reflow treatment, two near-infrared heaters (HYP-8N produced by HYBEC CORPORATION, rated voltage=100 V, rated power=560 W, parallel irradiation type) were arranged so as to face each other at an interval of 25 mm, and the tin-plated product was arranged at the central portion between the near-infrared heaters to be heated at a set current value of 10.8 A for 13 seconds in the atmosphere to melt the surface thereof. Immediately after melting the surface of the tin plating layer, the tin-plated product was immersed in a water tank at 25° C. to be cooled.

The tin-plated product thus reflow-treated was cut by means of a focused ion beam (FIB) to expose a cross-section perpendicular to the rolling direction of the tin-plated product, and the cross-section was analyzed by means of a field emission Auger electron spectrometer (FE-AES). As a result, it was confirmed that a copper-tin alloy layer of a copper-tin alloy was formed on the surface of the base material of the tin-plated product and that a tin layer of tin was formed on the surface of the copper-tin alloy layer. The thickness of each of the copper-tin alloy layer and the tin layer was measured by means of an electrolytic film thickness meter (Thickness Tester TH-11 produced by CHUO SEISAKUSHO LTD.). As a result, the thickness of the copper-tin alloy layer was 0.6 μm, and the thickness of the tin layer was 0.7 μm.

After the whole surface of one side of the tin-plated product thus reflow-treated was masked by applying a tape thereon, the tin-plated product was immersed in an aqueous solution containing 40 g/L of sodium hydroxide to be electrolytic-degreased for 30 seconds at 10 A/dm$^2$. Then, the tin-plated product was immersed in 100 g/L of sulfuric acid for 120 seconds to be pickled, and then, washed with water.

Then, the tin-plated product (the whole surface of the one side of which was masked by applying the tape thereon) and a nickel electrode plate were used as a cathode and an anode, respectively, to electroplate the tin-plated product at a current density of 10 A/dm$^2$ and a liquid temperature of 50° C. for 6 seconds in a nickel plating bath (a sulfamic acid containing bath) containing g/L of nickel sulfamate and 50 g/L of boric acid to form a nickel plating layer on the other side of the tin-plated product. The thickness of the nickel plating layer was measured by means of an X-ray fluorescent analysis thickness meter (produced by Seiko Instruments Inc.). As a result, the thickness of the nickel plating layer was 0.2 μm.

Then, the tin-plated produce thus plated with nickel (by masking the whole surface of the one side thereof by applying the tape thereon) and a zinc electrode plate were used as a cathode and an anode, respectively, to electroplate the tin-plated product at a current density of 20 A/dm² and a liquid temperature of 50° C. for 30 seconds in a zinc plating bath (sulfuric acid containing bath) of an aqueous solution containing 200 g/L of zinc sulfate and 30 g/L of ammonium sulfate to form a zinc plating layer on the surface of the nickel plating layer formed on the other side of the tin-plated product. The thickness of the zinc plating layer was measured by means of an X-ray fluorescent analysis thickness meter (produced by Seiko Instruments Inc.). As a result, the thickness of the zinc plating layer was 3 µm.

The tin-plated product, on which the zinc plating layer was thus formed, was cut by means of a focused ion beam (FIB) processing-observing device to expose a cross-section perpendicular to the rolling direction of the tin-plated product, and the cross-section was analyzed by means of a field emission Auger electron spectrometer (FE-AES). As a result, it was confirmed that a copper-tin alloy layer of a copper-tin alloy was formed on the surface of the base material of the tin-plated product, that a tin layer of tin was formed on the surface of the copper-tin alloy layer, that a nickel plating layer was formed on the surface of the tin layer and that a zinc plating layer was formed on the nickel plating layer. The thickness of each of these layers was measured from a scanning ion microscope image (SIM image). As a result, the thickness of the copper-tin alloy layer was 0.6 µm, the thickness of the tin layer was 0.7 µm, the thickness of the nickel layer was 0.2 µm, and the thickness of the zinc plating layer was 3 µm.

Then, a load of 10 kN was applied on a test piece having a size of 30 mm×10 mm×0.25 mm, which was cut off from the tin-plated product having the zinc plating layer, to carry out the 90° W bending (based on JIS H3110) of the test piece so that the ratio R/t of the minimum bending radius R to the thickness t of the test piece was 1.0, and the test piece was embedded in a resin. Thereafter, the test piece embedded in the resin was cut in directions parallel to the longitudinal directions of the test piece (directions perpendicular to the bending axis in the 90° W bending). Then, the cross-section was enlarged by means of a laser microscope (VK-X100 produced by KEYENCE CORPORATION) to observe the linear portion (rubbed against a die), valley-fold bent portion and mountain-fold bent portion of the test piece to evaluate the presence of separation of the zinc plating layer with the naked eye. As a result, the zinc plating layer was not peeled off from any portions, so that the adhesion of the zinc plating layer was good.

While the zinc plating layer of a test piece having a size of 50 mm×10 mm×0.25 mm, which was cut off from the tin-plated product having the zinc plating layer, was arranged on the outside, a single wire of pure aluminum (A1070) having a diameter of 0.8 mm and a length of 30 mm was swaged (or caulked) by the test piece. Then, the single wire swaged (or caulked) by the test piece was immersed in an aqueous solution containing 5% by weight of NaCl for evaluating corrosion resistance on the basis of generation time of gas due to galvanic corrosion (for allowing a less-noble metal to melt). As a result, the time to generate gas was a long time of not less than 192 hours, so that the corrosion resistance thereof was good.

The Vickers hardness HV of the surface of the tin-plated product having the zinc plating layer was measured at a measuring load of 0.005 kgf in accordance with JIS Z2244 using a micro-hardness testing machine (HM-200 produced by Mitutoyo Corporation). As a result, the Vickers hardness Hv was 55.

As the surface roughness of the tin-plated product having the zinc plating layer, the arithmetic average roughness Ra being a parameter exhibiting the surface roughness on the basis of JIS B0601 was calculated from the result of measurement using a contact surface roughness measuring apparatus (Surfcoder SE4000 produced by Kosaka Laboratory Ltd.). As a result, the arithmetic average roughness Ra of the tin-plated product having the zinc plating layer was 0.14 µm.

As the glossiness of the tin-plated product having the zinc plating layer, the visual reflection density thereof was measured using a glossiness meter (RD918 produced by SAKATA INX CORPORATION). As a result, the glossiness thereof was 0.15.

Figure 5:
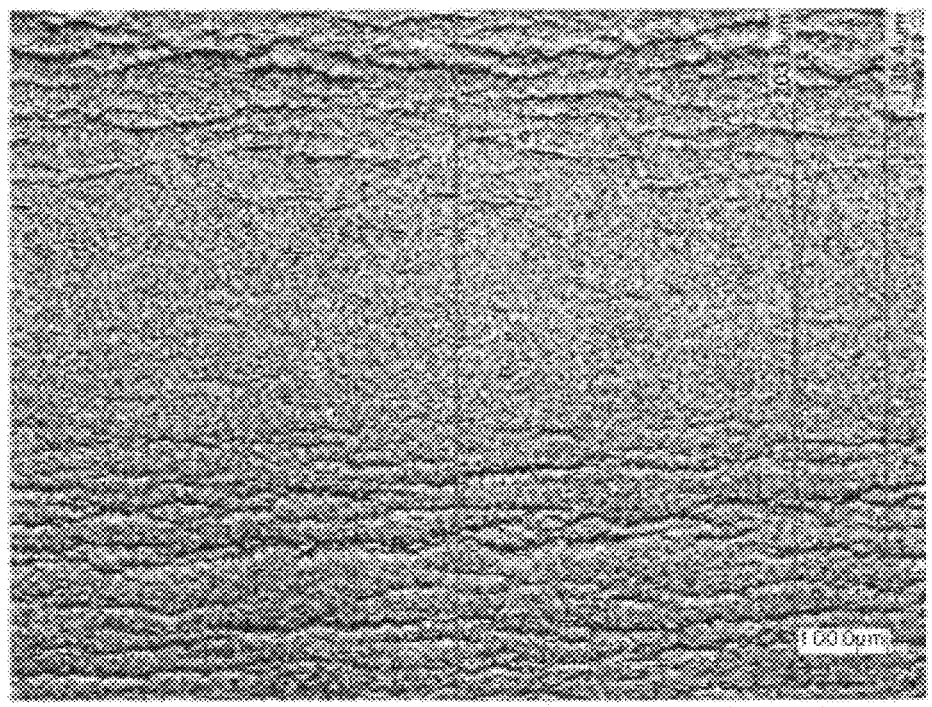
FIG. 5 is a photomicrograph of the surface of a mountain-fold bent portion of a test piece after the 90° W bending, the test piece being cut off from a tin-plated product in Example 9.

Then, a load of 10 kN was applied on a test piece having a size of 30 mm×10 mm×0.25 mm, which was cut off from the tin-plated product having the zinc plating layer, to carry out the 90° W bending (based on JIS H3110) of the test piece so that the ratio R/t of the minimum bending radius R to the thickness t of the test piece was 1.0, and the surface of the mountain-fold bent portion thereof was enlarged by means of a laser microscope (VK-X100 produced by KEYENCE CORPORATION) to be observed. The photomicrograph thereof is shown in FIG. 5. As shown in FIG. 5, it was confirmed that deep wrinkles were not formed on the surface of the mountain-fold bent portion. The arithmetic average roughness Ra of the surface of the mountain-fold bent portion was calculated by means of a laser microscope (VK-X100 produced by KEYENCE CORPORATION) (cut-off value=0.08 mm). As a result, the arithmetic average roughness Ra thereof was 0.7 µm. Furthermore, the arithmetic average roughness Ra of the surface of the mountain-fold bent portion is preferably 1.7 µm or less, and more preferably 1.5 µm or less.

Example 10

A tin-plated product having a zinc plating film was produced by the same method as that in Example 9, except that the zinc plating layer was formed so as to have a thickness of 40 µm by electroplating for 420 seconds.

The adhesion and corrosion resistance of the tin-plated product thus produced were evaluated by the same methods as those in Example 9. As a result, the zinc plating layer was not peeled off, so that the adhesion of the zinc plating layer was good. The time to generate gas was a long time of not less than 192 hours, so that the corrosion resistance thereof was good. There were obtained the Vickers hardness HV, arithmetic average roughness Ra and glossiness of the tin-plated product, and the arithmetic average roughness Ra of the surface of the mountain-fold bent portion thereof. As a result, the Vickers hardness HV was 51, and the arithmetic average roughness Ra was 1.2 µm. The glossiness was 0.12, and the arithmetic average roughness Ra of the surface of the mountain-fold bent portion was 1.2 µm.

Example 11

A tin-plated product having a zinc plating film was produced by the same method as that in Example 9, except that the zinc plating layer was formed so as to have a thickness of 1 µm by electroplating for 10 seconds.

The adhesion and corrosion resistance of the tin-plated product thus produced were evaluated by the same methods as those in Example 9. As a result, the zinc plating layer was not peeled off, so that the adhesion of the zinc plating layer was good. The time to generate gas was a long time of 144 hours, so that the corrosion resistance thereof was good.

There were obtained the Vickers hardness HV, arithmetic average roughness Ra and glossiness of the tin-plated product, and the arithmetic average roughness Ra of the surface of the mountain-fold bent portion thereof. As a result, the Vickers hardness HV was 62.5, and the arithmetic average roughness Ra was 0.11 µm. The glossiness was 0.17, and the arithmetic average roughness Ra of the surface of the mountain-fold bent portion was 1.0 µm.

Example 12

A tin-plated product having a zinc plating film was produced by the same method as that in Example 9, except that the nickel plating layer was formed so as to have a thickness of 3 µm by electroplating for 90 seconds.

The adhesion and corrosion resistance of the tin-plated product thus produced were evaluated by the same methods as those in Example 9. As a result, the zinc plating layer was not peeled off, so that the adhesion of the zinc plating layer was good. The time to generate gas was a long time of not less than 192 hours, so that the corrosion resistance thereof was good. There were obtained the Vickers hardness HV, arithmetic average roughness Ra and glossiness of the tin-plated product, and the arithmetic average roughness Ra of the surface of the mountain-fold bent portion thereof. As a result, the Vickers hardness HV was 55, and the arithmetic average roughness Ra was 0.14 µm. The glossiness was 0.15, and the arithmetic average roughness Ra of the surface of the mountain-fold bent portion was 0.7 µm.

Example 13

A tin-plated product having a zinc plating film was produced by the same method as that in Example 9, except that the nickel plating layer was formed so as to have a thickness of 0.1 µm by electroplating for 3 seconds.

The adhesion and corrosion resistance of the tin-plated product thus produced were evaluated by the same methods as those in Example 9. As a result, the zinc plating layer was not peeled off, so that the adhesion of the zinc plating layer was good. The time to generate gas was a long time of not less than 192 hours, so that the corrosion resistance thereof was good. There were obtained the Vickers hardness HV, arithmetic average roughness Ra and glossiness of the tin-plated product, and the arithmetic average roughness Ra of the surface of the mountain-fold bent portion thereof. As a result, the Vickers hardness HV was 55, and the arithmetic average roughness Ra was 0.14 µm. The glossiness was 0.15, and the arithmetic average roughness Ra of the surface of the mountain-fold bent portion was 0.7 µm.

Example 14 tin-plated product having a zinc plating film was produced by the same method as that in Example 9, except that there was used a plate-shaped conductive base material of a Cu—Zn alloy having a size of 50 mm×50 mm×0.25 mm (a base material of a copper alloy (C2600) comprising 30% by weight of zinc and the balance being copper) and that a copper plating layer having a thickness of 0.6 µm was formed on the base material after the pretreatment and before the formation of a tin plating layer. Furthermore, the base material and a copper electrode plate were used as a cathode and an anode, respectively, for electroplating at a current density of 5 A/dm² and a liquid temperature of 30° C. for 40 seconds in a copper plating solution containing 110 g/L of copper sulfate and 100 g/L of sulfuric acid to form the copper plating layer.

The tin-plated product thus reflow-treated was analyzed by the same method as that in Example 9. As a result, it was confirmed that a copper layer and a copper-tin alloy layer (of a copper-tin alloy) were formed on the surface of the base material of the tin-plated product and that a tin layer of tin was formed on the surface of the copper-tin alloy layer. The thickness of each of the copper-tin alloy layer and the tin layer was measured by the same method as that in Example 9. As a result, the thickness of the copper-tin alloy layer was 0.6 µm, and the thickness of the tin layer was 0.7 µm. The thickness of the copper layer was measured by means of an electrolytic film thickness meter (Thickness Tester TH-11 produced by CHUO SEISAKUSHO LTD.). As a result, the thickness of the copper layer was 0 µm.

The adhesion and corrosion resistance of the tin-plated product thus produced were evaluated by the same methods as those in Example 9. As a result, the zinc plating layer was not peeled off, so that the adhesion of the zinc plating layer was good. The time to generate gas was a long time of not less than 192 hours, so that the corrosion resistance thereof was good. There were obtained the Vickers hardness HV, arithmetic average roughness Ra and glossiness of the tin-plated product, and the arithmetic average roughness Ra of the surface of the mountain-fold bent portion thereof. As a result, the Vickers hardness HV was 55, and the arithmetic average roughness Ra was 0.14 µm. The glossiness was 0.15, and the arithmetic average roughness Ra of the surface of the mountain-fold bent portion was 0.7 µm.

Example 15

A tin-plated product having a zinc plating film was produced by the same method as that in Example 9, except that a nickel plating layer having a thickness of 0.3 µm was formed on the base material after the pretreatment and before the formation of a tin plating layer, and thereafter, a copper plating layer having a thickness of 0.3 µm was formed, and then, the tin plating layer was formed so as to have a thickness of 0.7 µm by electroplating for 14 seconds. Furthermore, the pretreated base material (the pretreated material to be plated), and a nickel electrode plate were used as a cathode and an anode, respectively, for electroplating at a current density of 5 A/dm² and a liquid temperature of 50° C. for 15 seconds in a nickel plating solution containing 80 g/L of nickel sulfamate and 45 g/L of boric acid to form the nickel plating layer. The base material plated with nickel, and a copper electrode plate were used as a cathode and an anode, respectively, for electroplating at a current density of 5 A/dm² and a liquid temperature of 30° C. for 12 seconds in a copper plating solution containing 110 g/L of copper sulfate and 100 g/L of sulfuric acid to form the copper plating layer.

The tin-plated product thus reflow-treated was analyzed by the same method as that in Example 9. As a result, it was confirmed that a nickel layer and a copper-tin alloy layer (of a copper-tin alloy) were formed on the surface of the base material of the tin-plated product and that a tin layer of tin was formed on the surface of the copper-tin alloy layer. Furthermore, the reflow treatment caused copper of the copper plating layer to diffuse to form the copper-tin alloy layer, so that the copper layer was not observed. The thickness of each of the copper-tin alloy layer and the tin layer was measured by the same method as that in Example 9. As a result, the thickness of the copper-tin alloy layer was 0.6 μm, and the thickness of the tin layer was 0.4 μm. The thickness of the nickel layer was measured by means of an X-ray fluorescent analysis thickness meter (produced by Seiko Instruments Inc.). As a result, the thickness of the nickel plating layer was 0.3 μm.

The adhesion and corrosion resistance of the tin-plated product thus produced were evaluated by the same methods as those in Example 9. As a result, the zinc plating layer was not peeled off, so that the adhesion of the zinc plating layer was good. The time to generate gas was a long time of not less than 192 hours, so that the corrosion resistance thereof was good. There were obtained the Vickers hardness HV, arithmetic average roughness Ra and glossiness of the tin-plated product, and the arithmetic average roughness Ra of the surface of the mountain-fold bent portion thereof. As a result, the Vickers hardness HV was 55, and the arithmetic average roughness Ra was 0.14 μm. The glossiness was 0.15, and the arithmetic average roughness Ra of the surface of the mountain-fold bent portion was 0.7 μm.

Comparative Example 5

A tin-plated product was produced by the same method as that in Example 9, except that the electrolytic-degreasing and pickling of the tin-plated product were not carried out after the reflow treatment and that the nickel plating layer and the zinc plating layer were not formed on the surface of the tin-plated product.

The corrosion resistance of the tin-plated product thus produced was evaluated by the same methods as that in Example 9. As a result, the time to generate gas was a very short time of 24 hours, so that the corrosion resistance thereof was bad.

Comparative Example 6

A tin-plated product was produced by the same method as that in Example 9, except that the nickel plating layer was not formed on the surface of the tin-plated product.

The adhesion of the zinc plating layer of the tin-plated product thus produced was evaluated by the same method as that in Example 9. As a result, although the zinc plating layer was not peeled off on the surface of the mountain-fold bent portion, the zinc plating layer was peeled off on the linear portion (rubbed against a die) and the valley-fold bent portion, so that the adhesion of the zinc plating layer was not good.

Comparative Example 7

A tin-plated product having a zinc plating film was produced by the same method as that in Example 9, except that the nickel plating layer was formed on the surface of the tin-plated product so as to have a thickness of 10 μm by electroplating for 290 seconds.

The adhesion of the zinc plating layer of the tin-plated product thus produced was evaluated by the same method as that in Example 9. As a result, although the zinc plating layer was not peeled off on the surface of the mountain-fold bent portion, the zinc plating layer was peeled off on the linear portion (rubbed against a die) and the valley-fold bent portion, so that the adhesion of the zinc plating layer was not good.

The producing conditions and characteristics of the tin-plated products in these Examples and Comparative Examples are shown in Tables 4 through 6. Furthermore, in Table 6, "○" is shown if the adhesive was good, and "x" is shown if the zinc plating layer was peeled off so that the adhesive was not good.

TABLE 4

| | Base Material | Thickness (μm) of Layers | | | | |
|---|---|---|---|---|---|---|
| | | Before Reflow Treatment | | | After Reflow Treatment | |
| | | Ni | Cu | Sn | CuSn | Sn |
| Ex. 9 | NB-109 | 0 | 0 | 1 | 0.6 | 0.7 |
| Ex. 10 | NB-109 | 0 | 0 | 1 | 0.6 | 0.7 |
| Ex. 11 | NB-109 | 0 | 0 | 1 | 0.6 | 0.7 |
| Ex. 12 | NB-109 | 0 | 0 | 1 | 0.6 | 0.7 |
| Ex. 13 | NB-109 | 0 | 0 | 1 | 0.6 | 0.7 |
| Ex. 14 | C2600 | 0 | 0.6 | 1 | 0.6 | 0.7 |
| Ex. 15 | NB-109 | 0.3 | 0.3 | 0.7 | 0.6 | 0.4 |
| Comp. 5 | NB-109 | 0 | 0 | 1 | 0.6 | 0.7 |
| Comp. 6 | NB-109 | 0 | 0 | 1 | 0.6 | 0.7 |
| Comp. 7 | NB-109 | 0 | 0 | 1 | 0.6 | 0.7 |

TABLE 5

| | Electrolytic Degreasing Time (sec) | Pickling Time (sec) | Thickness (μm) of Ni Plating Layer | Zn Plating | |
|---|---|---|---|---|---|
| | | | | Plating Bath | Thickness (μm) of Plating |
| Ex. 9 | 30 | 120 | 0.2 | Sulfur | 3 |
| Ex. 10 | 30 | 120 | 0.2 | Sulfur | 40 |
| Ex. 11 | 30 | 120 | 0.2 | Sulfur | 1 |
| Ex. 12 | 30 | 120 | 3 | Sulfur | 3 |
| Ex. 13 | 30 | 120 | 0.1 | Sulfur | 3 |
| Ex. 14 | 30 | 120 | 0.2 | Sulfur | 3 |
| Ex. 15 | 30 | 120 | 0.2 | Sulfur | 3 |
| Comp. 5 | — | — | — | — | — |
| Comp. 6 | 30 | 120 | — | Sulfur | 3 |
| Comp. 7 | 30 | 120 | 10 | Sulfur | 3 |

*Sulfur: Sulfuric Acid containing Bath

TABLE 6

| | Adhesion | Gas Generation Time (h) | Hardness (HV) | Arithmetic Average Roughness Ra (μm) | Grossness | Arithmetic Average Roughness Ra (μm) of Valley-Fold Bent Portion |
|---|---|---|---|---|---|---|
| Ex. 9 | ○ | 192 or more | 55 | 0.14 | 0.15 | 0.7 |
| Ex. 10 | ○ | 192 or more | 51 | 1.2 | 0.12 | 1.2 |
| Ex. 11 | ○ | 144 | 62.5 | 0.11 | 0.17 | 1.0 |
| Ex. 12 | ○ | 192 or more | 55 | 0.14 | 0.15 | 0.7 |
| Ex. 13 | ○ | 192 or more | 55 | 0.14 | 0.15 | 0.7 |
| Ex. 14 | ○ | 192 or more | 55 | 0.14 | 0.15 | 0.7 |
| Ex. 15 | ○ | 192 or more | 55 | 0.14 | 0.15 | 0.7 |
| Comp. 5 | — | 24 or less | — | — | — | — |
| Comp. 6 | x | — | — | — | — | — |
| Comp. 7 | x | — | — | — | — | — |

DESCRIPTION OF REFERENCE NUMBERS

10 Base Material
12 Tin Containing Layer

14 Nickel Plating Layer
16 Zinc Plating Layer
18 Underlying Layer
121 Copper-Tin Alloy Layer
122 Tin Layer
181 Nickel Layer
182 Copper Layer

The invention claimed is:

1. A tin-plated product comprising:
   a base material of copper or a copper alloy;
   a tin containing layer formed on a surface of the base material, the tin containing layer comprising a copper-tin alloy layer and a tin layer of tin which is formed on a surface of the copper-tin alloy layer and which has a thickness of not larger than 5 μm;
   a nickel plating layer formed on a surface of the tin containing layer; and
   a zinc plating layer serving as the outermost layer formed on a surface of the nickel plating layer, the zinc plating layer being made of zinc or a zinc alloy containing 90% by weight or more of zinc.

2. The tin-plated product as set forth in claim 1, wherein said copper-tin alloy layer has a thickness of 0.2 to 2 μm.

3. The tin-plated product as set forth in claim 1, wherein said nickel plating layer has a thickness of 0.01 to 5 μm.

4. The tin-plated product as set forth in claim 1, wherein said zinc plating layer has a thickness of 0.5 to 40 μm.

5. The tin-plated product as set forth in claim 1, which further comprises an underlying layer between said base material and said tin containing layer.

6. The tin-plated product as set forth in claim 5, wherein said underlying layer is a layer containing at least one of copper and nickel.

7. The tin-plated product as set forth in claim 1, wherein said zinc plating layer is formed on a surface of said tin containing layer on only one side of said base material as the outermost layer of the one side thereof and wherein said tin containing layer is formed on the other side of said base material as the outermost layer of the other side thereof.

8. The tin-plated product as set forth in claim 1, wherein said zinc plating layer has a Vickers hardness HV of not higher than 80.

9. The tin-plated product as set forth in claim 8, wherein the surface of said zinc plating layer has an arithmetic average roughness Ra of 0.1 to 3.0 μm.

10. The tin-plated product as set forth in claim 8, wherein the surface of said zinc plating layer has a visual reflection density of not higher than 1.2, the visual reflection density being measured using RD918 produced by SAKATA INX CORPORATION.

11. The tin-plated product as set forth in claim 8, wherein said nickel plating layer is formed on a part of a surface of said tin containing layer.

* * * * *